UNITED STATES PATENT OFFICE.

WILHELM BAUER, OF VOHWINKEL, NEAR ELBERFELD, AND ALFRED HERRE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VAT DYE.

997,260.     Specification of Letters Patent.     Patented July 11, 1911.

No Drawing.     Application filed November 8, 1910. Serial No. 591,276.

*To all whom it may concern:*

Be it known that we, WILHELM BAUER and ALFRED HERRE, doctors of philosophy, chemists, citizens of the German Empire, residing, respectively, at Vohwinkel, near Elberfeld, and Elberfeld, Kingdom of Prussia, Germany, have invented useful Improvements in New Vat Dyes, of which the following is a specification.

Our present invention relates to the manufacture and production of new vat dyestuffs, which are obtained by condensing 1 molecule of a 2-arylido-3-keto-dihydro-1-thionaphthene compound, especially 2-para-dimethylaminoanilido-3-keto-dihydro-1-thionaphthene, 2-para-dimethylamino-anilido-3-keto-dihydro-5-chloro-1-thionaphthene with 1 molecule of 1-anthrol.

The new dyes are after being dried and pulverized violet powders soluble in hot benzene with a violet-red coloration with a deep red fluorescence, yielding with hydrosulfite and $Na OH$ vats dyeing cotton fast violet shades.

In order to illustrate the new process more fully the following example is given, the parts being by weight:—A hot solution in glacial acetic acid of 282 parts of 2-para-amino-dimethylanilido-3-keto-dihydro-1-thionaphthene (obtainable from nitrosodimethylanilin and 3-oxy-1-thionaphthene) and of 194 parts of 1-anthrol is heated on the water bath for about ½ hour. The process proceeds most probably according to the following equation:

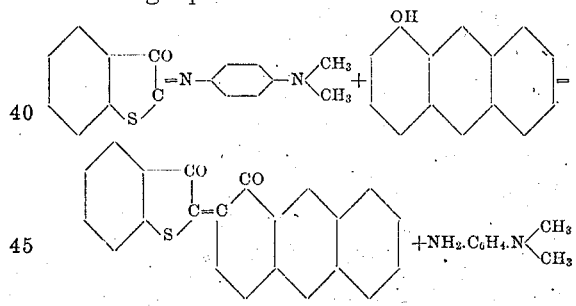

The dye which separates on cooling is filtered off and washed. It is a violet crystalline powder soluble in hot benzene with a violet-red color with a deep red fluorescence and in concentrated sulfuric acid with a green color. By treatment with hydrosulfite and $Na OH$ a brownish yellow vat results from which cotton is dyed in pure fast violet shades.

We claim:—

1. The herein described new vat dyestuffs containing in their molecule the group:

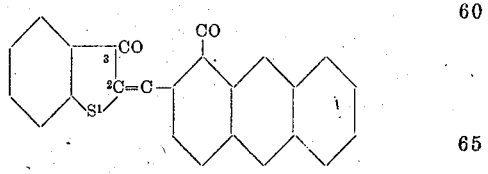

which dyes are after being dried and pulverized violet powders soluble in hot benzene with a violet red coloration with a deep red fluorescence, yielding with hydrosulfite and $Na OH$ vats dyeing cotton fast violet shades, substantially as described.

2. The herein described new vat dyestuff having probably the formula:

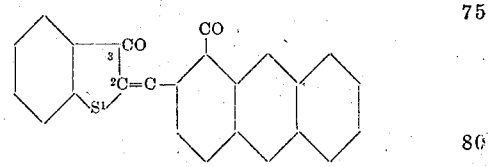

which dye is a violet crystalline powder soluble in hot benzene with a violet-red color with a deep red fluorescence and in concentrated sulfuric acid with a green color; yielding upon treatment with hydrosulfite and $Na OH$ a brownish-yellow vat from which cotton is dyed in pure fast violet shades, substantially as described.

In testimony whereof we have hereunto set our hands in the presence of two subscribing witnesses.

WILHELM BAUER. [L. S.]
    ALFRED HERRE. [L. S.]

Witnesses:
    CHAS. J. WRIGHT,
    ALFRED HENKEL.